No. 607,697. Patented July 19, 1898.
C. A. MYERS.
ELECTRIC RAILROAD.
(Application filed Nov. 18, 1897.)
(No Model.)
*Fig. 1*
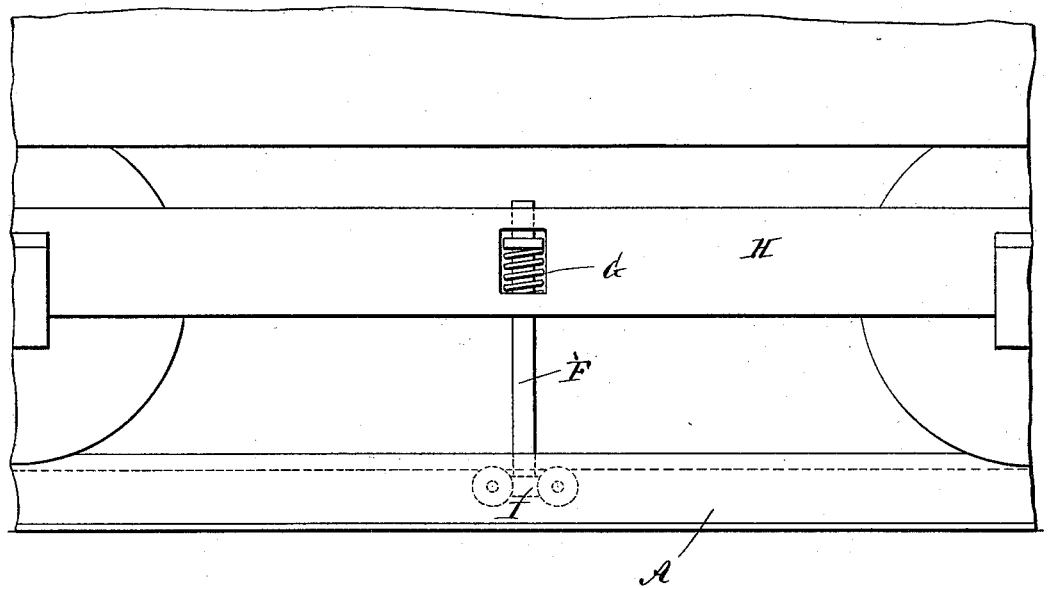
*Fig. 2,*
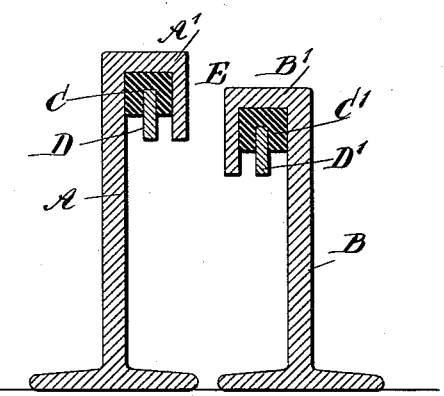
*Fig. 3,*
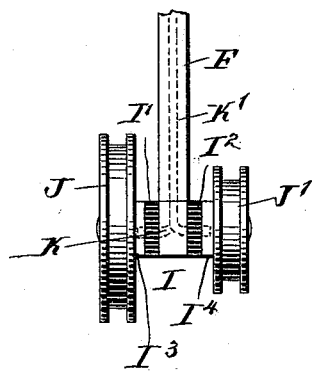
*Fig. 4.*
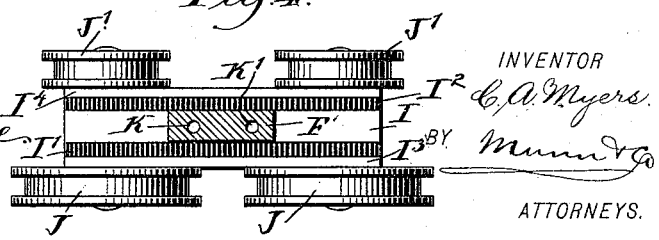
WITNESSES:
Edward Thorpe
INVENTOR
C. A. Myers.
BY Munn & Co
ATTORNEYS.
THE NORRIS PETERS CO., PHOTO-LITHO., WASHINGTON, D. C.

UNITED STATES PATENT OFFICE.

CLARENCE A. MYERS, OF ATLANTIC CITY, NEW JERSEY.

ELECTRIC RAILROAD.

SPECIFICATION forming part of Letters Patent No. 607,697, dated July 19, 1898.

Application filed November 18, 1897. Serial No. 658,943. (No model.)

*To all whom it may concern:*

Be it known that I, CLARENCE A. MYERS, of Atlantic City, in the county of Atlantic and State of New Jersey, have invented certain new and useful Improvements in Electric Railroads, of which the following is a full, clear, and exact description.

The object of the invention is to provide certain new and useful improvements in electric railroads whereby the conductor for the electricity is safely carried underground, the overhead wires being completely dispensed with, and at the same time provision is made for the return-current to the central station.

The invention consists of novel features and parts and combinations of the same, as hereinafter more fully described, and pointed out in the claims.

Reference is to be had to the accompanying drawings, forming a part of this specification, in which similar characters of reference indicate corresponding parts in all the figures.

Figure 1 is a side elevation of the improvement. Fig. 2 is an enlarged cross-section of the duct and the conductors. Fig. 3 is an enlarged end elevation of the trolley, and Fig. 4 is a sectional plan view of the same.

The electric railroad is provided with a duct formed by two rails A and B, placed opposite each other, as is plainly indicated in Fig. 2, and with the heads A' and B' of the rails made inverted-U shape to form longitudinal recesses or grooves for the reception of insulating materials C C', respectively, carrying conductors D D', preferably in the shape of metallic strips depending from the inside of the insulating materials, as plainly indicated in Fig. 2. The heads A' and B' are placed with their inner or adjacent flanges a suitable distance apart to form a slot E, through which extends a trolley arm or pole F, supported at its upper end on springs G, carried by a car H. (See Fig. 1.)

The trolley-arm F is provided at its lower end with a support or body I for the trolley-wheels J J', of which the trolley-wheels J are in frictional contact with the conductor D for feeding the electricity to the motor, while the other trolley-wheels J' are in contact with the conductor D' for returning the electricity to the station. The wheels J and J' are preferably grooved, as indicated in Fig. 3, to hold the wheels in proper contact and in engagement with the conductors D D'.

The support I is provided on opposite sides with insulating-strips I' I², to which are fitted the plates I³ I⁴, carrying journals for the sets of wheels J J', respectively, so that the said wheels are insulated from each other and from the support I. The plate I³ is connected by an insulated wire K, which extends through the trolley-arm F, to the motor to supply the latter with electricity, and the other plate I⁴ is connected by a return-wire K' with the motor, the said wire extending likewise through the trolley-arm F, as indicated in the drawings.

Now it will be seen that by the arrangement described the electricity is not liable to come in contact with either of the rails A B or the ground, and consequently there is no loss of power, and at the same time all danger by contact with the rails is avoided. Furthermore, the electricity readily passes from the feed wire or conductor D to the motor in the car, and provision is made for the return-current back to the central station by the wire K', the wheels J', and the return wire or conductor D'.

As illustrated in Fig. 2, the treads or upper surfaces of the rail-sections A and B are on different levels, so that the structure may be used as a rail of the track, the lower section being on the inner side to accommodate the car-wheel flanges. If desired, the return-conductor in this combined rail and conduit may be dispensed with and the opposite rails used for such return.

Having thus fully described my invention, I claim as new and desire to secure by Letters Patent—

1. A track-rail, comprising two sections spaced apart and forming opposite walls of a conduit, the tread of one section being below the plane of the other section-tread, an insulating material arranged in a groove in the under side of a section-tread and a conductor for electricity supported by said insulating material, substantially as specified.

2. A track-rail, comprising two sections spaced apart and forming opposite walls of a conduit, the tread of one section being below the plane of the other section-tread, an insulating material arranged in a groove in the under side of each section-tread, and conductors for electricity, supported by the insulating material, substantially as specified.

CLARENCE A. MYERS.

Witnesses:
CARLTON GODFREY,
SARA MARVEL.